United States Patent
Maddocks et al.

(10) Patent No.: US 6,483,616 B1
(45) Date of Patent: Nov. 19, 2002

(54) SAFE REPAIR OF MALFUNCTION IN OPTICAL COMMUNICATION SYSTEM

(75) Inventors: David J Maddocks, Nuneaton (GB); Paul A Callan, Loughborough (GB)

(73) Assignee: Marconi Communications Limited, Coventry (GB)

( * ) Notice: Subject to any disclaimer, the term of this patent is extended or adjusted under 35 U.S.C. 154(b) by 0 days.

(21) Appl. No.: 09/391,750

(22) Filed: Sep. 8, 1999

(30) Foreign Application Priority Data

Mar. 19, 1999 (GB) .............................................. 9906394

(51) Int. Cl.[7] .............................................. H04B 10/08
(52) U.S. Cl. ....................... 359/110; 359/173; 359/177; 359/188
(58) Field of Search ................................ 359/110, 177, 359/173, 188

(56) References Cited

U.S. PATENT DOCUMENTS

| 4,833,668 A | * | 5/1989 | Rowley ...................... 359/110 |
| 4,994,675 A | | 2/1991 | Levin et al. |
| 5,428,471 A | * | 6/1995 | McDermott ................... 359/117 |
| 5,790,293 A | * | 8/1998 | Frigo ........................... 359/173 |
| 6,075,628 A | * | 6/2000 | Fisher et al. ................. 359/110 |
| 6,359,708 B1 | * | 3/2002 | Goel et al. ................... 359/110 |

FOREIGN PATENT DOCUMENTS

| EP | 0 382 243 A2 | 2/1990 |
| EP | 0 581 138 A1 | 2/1994 |

* cited by examiner

*Primary Examiner*—Daniel J. Wu
(74) *Attorney, Agent, or Firm*—Kirschstein, etal.

(57) ABSTRACT

Following a fault in a bidirectional optical communication system, the lasers which generate traffic-carrying channels and a supervisory channel are shut down to permit personnel to effect repairs safely. The low power supervisory channel is pulsed on at intervals to determine if the fault is still present, but if a receiver is able correctly to restore frame alignment from such a pulse, the reverse direction supervisory channel is enabled, and following frame alignment in both directions, the main lasers are safely turned on.

16 Claims, 1 Drawing Sheet

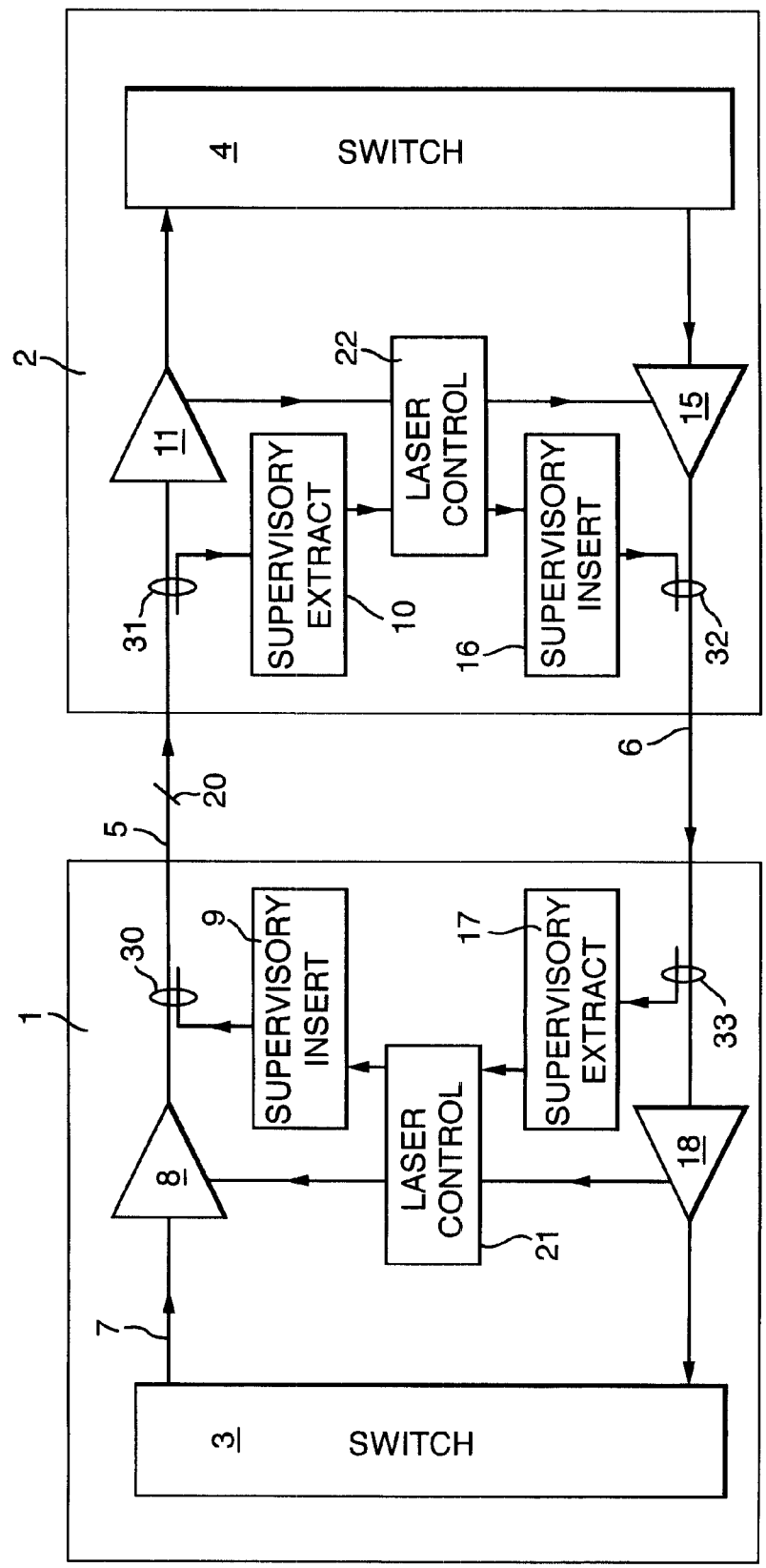

SAFE REPAIR OF MALFUNCTION IN OPTICAL COMMUNICATION SYSTEM

BACKGROUND OF THE INVENTION

This invention relates to an optical communication system, and is particularly concerned with such a system in which high intensity light is transmitted along a light guide, such as an optical fibre. If a break occurs in the light guide, or if in-line components between a transmitter and a receiver fail, it is necessary to effect a repair. In the past, the intensity of light travelling along a light guide has tended to be fairly low, with a consequently low risk of harm to an operator during the repair. However, as the intensity of light increases, for example in WDM (wave division multiplex) optical communication systems in which light from possibly a large number of high power lasers is transmitted down a common light guide, the risk of injury becomes significant. In the event that a break in the light path is detected, transmission of the light is shut down, but resetting the system so that the transmission of light can be restored safely and without excessive down time is difficult.

SUMMARY OF THE INVENTION

The present invention seeks to provide an improved optical communication system.

According to this invention, an optical communication system includes a transmitter and a receiver linked by a light guide, means for transmitting a traffic-carrying optical channel and a supervisory optical channel along said light guide, means consequent upon a malfunction in the light guide for ceasing transmission of the traffic-carrying optical channel and means utilizing the supervisory optical channel to determine when the light guide is reusable for communication purposes.

As the supervisory optical channel is a single optical channel, it can be within the safe limits for personnel handling the broken or damaged light guide, but preferably it operates at a power which is lower than each of the traffic-carrying channels Preferably, following detection of the malfunction, the supervisory optical channel is operated in a pulsed manner. This reduces its mean power to a lower, safe level.

The light guide is preferably an optical fibre. Such fibres can be damaged or broken fairly easily giving rise to a malfunction which prevents proper transmission of data traffic.

The supervisory channel is preferably coupled into the optical fibre downstream of power amplifiers which amplify the traffic-carrying channels to their required level. This greatly enhances the reliability of the supervisory channel, as it is not affected by malfunction of the high power optical amplifiers.

The data traffic may be sent in a bidirectional manner between two points, utilizing two light guides each having a transmitter and receiver associated therewith. If, however, a single light guide is used for bidirectional working, the supervisory channel preferably carries identifier signals in the event of a malfunction of the light guide, the identifiers used for the two directions of transmission differing. In the case of localized damage to a light guide light transmitted from one end will be partially reflected back from the location of the damage to the transmitting end, whereas light transmitted from the other end of the light guide may be partially transmitted by the localized damage. The use of different identifier signals on the supervisory channel enables the reflected and transmitted signals to be distinguished.

BRIEF DESCRIPTION OF THE DRAWINGS

The invention is further described by way of example with reference to the accompanying drawing which illustrates diagrammatically part of an optical communication system in accordance with the present invention.

DETAILED DESCRIPTION OF THE PREFERRED EMBODIMENTS

Referring to the drawing, there is shown therein an optical communication system having two switching units 1 and 2, each of which could comprise an optical add/drop multiplexer or a cross-connect switch 3, 4. The switching units 1 and 2 are linked by two light guides which take the form of optical fibres 5 and 6, and in practice the units 1 and 2 may be many kilometers apart. Instead, however, a repeater or simple add/drop unit may be positioned at one or both ends of the link shown. The units 1 and 2 form part of a larger network which in practice, will contain many routing nodes, each of which may comprise a switching unit or an add/drop unit. The switch 3 generates, by means of an optical multiplexer not separately shown, a number of separate optical channels at different optical carrier wavelengths each of which carries voice and/or data traffic. These channels are sent along a common light fibre 7 in wavelength division multiplex (WDM) format to an optical amplifier 8 which amplifies the optical signals by means of high power lasers to a high power level for transmission to the distant switching unit 2 via the optical fibre 5.

A relatively low power supervisory channel signal is generated at a supervisory insert unit 9 which includes a laser source and is added to the fibre 5 by optical coupler 30, the supervisory signal having a different carrier wavelength to each of the traffic-carrying optical channels. The supervisory channel has a much lower optical power than each of the traffic-carrying optical channels. In normal operation, the supervisory channel carries relatively low frequency (eg.2 Mbit) path and routing information, and frame alignment signals, and only travels from one node to the next where it is regenerated, whereas the traffic-carrying channels carry high frequency signals, and may pass through several nodes before the data traffic is regenerated.

At the switching unit 2, the supervisory channel is extracted by optical coupler 31 and passed to extract unit 10, whilst the traffic-carrying optical channels are passed to an amplifier 11 which compensates for any reduction of optical signal level due to attenuation by the fibre 5. The amplified signal is passed to switch 4, which is similar to switch 3, where the optical channels are demultiplexed, switched and routed as necessary. The optical coupler 31 is frequency selective and is operative to direct the supervisory optical channel to the extract unit 10.

The fibre 5 carries a unidirectional signal from switching unit 1 to switching unit 2. The similar optical fibre 6 carries a unidirectional signal from switching unit 2 to switching unit 1, and it has associated with it an amplifier 15, supervisory insert unit 16, optical couplers 32 and 33, supervisory extract unit 17 and amplifier 18 in an analogous manner.

The light signals generated by amplifiers 8 and 15 are very intense laser beams, and care must be taken so that they do not harm personnel. In the event of a break 20 or other malfunction in fibre 5 due to local damage, a loss of signal is detected at the laser control unit 22. At the same time laser control unit 22 detects a loss of frame condition from the supervisory extract unit 10 and when both the loss of signal condition and loss of frame condition are detected at the laser control unit 22, this unit shuts down the high power laser beams from amplifier .15 and shuts down the laser in the supervisory insert unit 16.

Laser control unit 21 detects that amplifier 15 has been shut down by detecting its loss of signal at amplifier 18, and detects that supervisory unit 16 has been shut down by detecting the loss of frame condition, and in response shuts down amplifier 8 and the laser in the supervisory insert unit 9.

The break in the fibres 5, 6 and any damage to them can be safely repaired by personnel. During the repair period, the amplifiers 8 and 15 are inhibited but the supervisory channel continues to be transmitted at its low level, and it is transmitted in a pulsed manner, so that its mean power level is further substantially reduced. Typically the supervisory channel is pulsed on for about two seconds each minute, as such a pulse has sufficient duration to permit frame alignment to be recovered when its signal is received at the far end of a link. Typically a frame period in a communication system is 125 $\mu$s, but a frame alignment signal must be present for many frame periods to enable signal lock and synchronization between receiver and transmitter to be achieved.

The effect of this is that the frame alignment signal transmitted from switching unit 1 will be received at the far end of the link when the fibre is repaired and this is used by laser control unit 22 to turn on the supervisory insert unit 16. When laser control unit 21 receives the supervisory channel, it acts to enable supervisory insert unit 9. In response to correct completion of the supervisory channel loop, the amplifiers 8 and 15 are enabled, and operation of the communication system recommences. The couplers 30 and 32 are located downstream of the amplifiers 8 and 15 and as close to the output ports of switching units 1 and 2 as possible, so that even if a fault occurs in the switching units, particularly in the high power amplifiers, the supervisory channel is maintained. Thus, the supervisory insert unit includes a modulated laser whose output is coupled directly without further amplification onto the respective optical fibre at the output ports of the switching unit 1 or 2.

In an optical communication system which uses a single optical fibre to carry bidirectional traffic, the above system requires modification, since a break in or damage to the fibre will result in some reflection of the transmitted signal back into a receive circuit. Thus, the receive circuit would continue to receive a signal even in the event of a break.

This difficulty is overcome by transmitting over the supervisory channel an identifier signal which uniquely identifies a particular transmitter. In the event of damage to or a break in the fibre, receipt of an identifier signal which differs from that expected under normal operation will cause the laser amplifiers to be shut down. As before, the supervisory channel generates pulsed signals which are used to detect repair of the fibre, and to enable the high power optical amplifiers to be reset and enabled.

What is claimed is:
1. An optical communication system, comprising:
 a) a transmitter and a receiver linked by a light guide;
 b) means for transmitting at least one traffic-carrying optical channel and a supervisory optical channel along the light guide;
 c) means consequent upon a malfunction in the light guide, for inhibiting transmission of the at least one traffic-carrying optical channel;
 d) means utilizing the supervisory optical channel, for determining when the light guide is re-usable for communication purposes; and
 e) means consequent upon inhibiting the transmission of the at least one traffic-carrying channel, for subsequently transmitting the supervisory optical channel in a pulsed manner having a mark-space ratio of substantially less than unity.

2. The system as claimed in claim 1, wherein each pulse of the supervisory optical channel is of sufficient duration to permit re-establishment of frame alignment.

3. The system as claimed in claim 1, including a plurality of traffic-carrying optical channels, and wherein transmission of each of said plurality of traffic-carrying optical channels is inhibited upon detection of the malfunction.

4. The system as claimed in claim 3, wherein an optical power of the supervisory optical channel is less than an optical power of any one of the traffic-carrying channels.

5. The system as claimed in claim 1, wherein the transmitter includes an optical amplifier for amplifying the. at least one traffic-carrying optical channel prior to transmission along the light guide, and wherein the supervisory optical channel is coupled into the light guide downstream of the amplifier.

6. The system as claimed in claim 1, wherein the supervisory optical channel is generated by means of a laser, and is fed to an output port of the transmitter without further amplification.

7. The system as claimed in claim 1, wherein two light guides are provided to link two locations, each location having a said transmitter and a said receiver, each light guide being arranged to carry unidirectional information, and wherein detection of the malfunction in one of the light guides is arranged to cause cessation of the transmission of the at least one traffic-carrying optical channel in both light guides.

8. The system as claimed in claim 1, wherein a single bi-directional light guide is provided to link two locations, each location having a said transmitter and a said receiver, and wherein an identifier signal is transmitted by each transmitter to identify a source of the transmitted optical channel.

9. An optical communication system, comprising:
 a) a transmitter and a receiver linked by a light guide;
 b) means for transmitting at least one traffic-carrying optical channel and a supervisory optical channel along the light guide;
 c) means consequent upon a malfunction in the light guide, for inhibiting transmission of the at least one traffic-carrying optical channel; and
 d) means utilizing the supervisory optical channel, for determining when the light guide is re-usable for communication purposes;
 e) wherein the transmitter includes an optical amplifier for amplifying the at least one traffic-carrying optical channel prior to transmission along the light guide; and
 f) wherein the supervisory optical channel is coupled into the light guide downstream of the amplifier.

10. The system as claimed in claim 9, including a plurality of traffic-carrying optical channels, and wherein transmission of each of said plurality of traffic-carrying optical channels is inhibited upon detection of the malfunction.

11. The system as claimed in claim 10, wherein an optical power of the supervisory optical channel is less than an optical power of any one of the traffic-carrying channels.

12. The system as claimed in claim 9, wherein the supervisory optical channel is generated by means of a laser, and is fed to an output port of the transmitter without further amplification.

13. The system as claimed in claim 9, and means consequent upon inhibiting the transmission of the at least one traffic-carrying channel, for subsequently transmitting the supervisory optical channel in a pulsed manner having a mark-space ratio of substantially less than unity.

14. The system as claimed in claim 13, wherein each pulse of the supervisory optical channel is of sufficient duration to permit re-establishment of frame alignment.

15. The system as claimed in claim 10, wherein two light guides are provided to link two locations, each location having a said transmitter and a said receiver, each light guide being arranged to carry unidirectional information, and wherein detection of the malfunction in one of the light guides is arranged to cause cessation of the transmission of traffic-carrying optical channels in both the light guides.

16. The system as claimed in claim 9, wherein a single bi-directional light guide is provided to link two locations, each location having a said transmitter and a said receiver, and wherein an identifier signal is transmitted by each transmitter to identify a source of the transmitted optical channel.

\* \* \* \* \*